United States Patent
Einhaus et al.

(10) Patent No.: US 6,270,289 B1
(45) Date of Patent: Aug. 7, 2001

(54) PROCESS AND DEVICE FOR REHABILITATING PIPES

(75) Inventors: Gerhard Einhaus, Leimen; Herbert Schreiner, Steinheim, both of (DE)

(73) Assignee: KMG Kanal-Muller-Gruppe International GmbH & Co. KG, Schieder-Schwalenberg (DE)

( * ) Notice: Subject to any disclaimer, the term of this patent is extended or adjusted under 35 U.S.C. 154(b) by 0 days.

(21) Appl. No.: 09/442,201

(22) Filed: Nov. 16, 1999

(30) Foreign Application Priority Data

Nov. 16, 1998 (DE) .............................. 198 52 690

(51) Int. Cl.⁷ .................................................. F16L 1/00
(52) U.S. Cl. .......................................... 405/184.2; 138/98
(58) Field of Search ........................... 405/184.2, 184.1, 405/154, 156, 174; 138/97, 98; 425/59, 387.1, 182

(56) References Cited

U.S. PATENT DOCUMENTS

| | | | |
|---|---|---|---|
| Re. 36,859 | * 9/2000 | Storah | 138/98 |
| 3,959,424 | * 5/1976 | Dawson et al. | 264/230 |
| 4,135,958 | 1/1979 | Wood | 156/199 |
| 4,182,262 | * 1/1980 | Everson et al. | 118/44 |
| 4,366,012 | 12/1982 | Wood | 156/93 |
| 4,401,696 | 8/1983 | Wood | 427/236 |
| 4,434,115 | 2/1984 | Chick | 264/36 |
| 4,439,469 | 3/1984 | Wood | 427/230 |
| 4,581,247 | 4/1986 | Wood | 427/53.1 |
| 4,602,974 | 7/1986 | Wood et al. | 156/287 |
| 4,622,196 | 11/1986 | Wood | 264/229 |
| 4,637,754 | 1/1987 | Wood | 405/150 |
| 4,714,095 | 12/1987 | Müller et al. | 138/98 |
| 4,758,454 | 7/1988 | Wood | 428/36 |
| 4,770,562 | 9/1988 | Müller et al. | 405/154 |
| 5,029,615 | 7/1991 | Müller | 138/98 |
| 5,154,936 | * 10/1992 | Driver et al. | 425/182 |
| 5,163,481 | 11/1992 | Catallo | 138/98 |
| 5,172,730 | 12/1992 | Driver | 138/104 |
| 5,280,811 | 1/1994 | Catallo et al. | 138/98 |
| 5,322,653 | 6/1994 | Müller | 264/35 |
| 5,368,423 | 11/1994 | Hanna | 409/132 |
| 5,388,616 | 2/1995 | Müller | 138/98 |
| 5,407,630 | * 4/1995 | Smith | 264/516 |
| 5,477,887 | 12/1995 | Catallo | 138/97 |
| 5,510,078 | * 4/1996 | Smith et al. | 264/516 |
| 5,609,439 | 3/1997 | Schreiner et al. | 405/154 |
| 5,653,555 | 8/1997 | Catallo | 405/154 |
| 5,680,885 | 10/1997 | Catallo | 138/98 |
| 5,699,838 | 12/1997 | Catallo et al. | 141/65 |
| 6,093,363 | * 7/2000 | Polivka | 264/516 |
| 6,117,507 | * 9/2000 | Smith | 428/36.9 |
| 6,170,531 | * 1/2001 | Jung et al. | 138/98 |

FOREIGN PATENT DOCUMENTS

| | | | |
|---|---|---|---|
| 47832/90 | 5/1991 | (AU) | F16L/55/18 |
| 2350976C2 | 4/1974 | (DE) | F16L/55/16 |
| 29 12 840 | 3/1979 | (DE) | F16L/55/16 |
| 3520696A1 | 6/1985 | (DE) | F16L/55/16 |

\* cited by examiner

Primary Examiner—David Bagnell
Assistant Examiner—Raymond Addie
(74) Attorney, Agent, or Firm—Howrey Simon; Arnold & White, LLP

(57) ABSTRACT

A process and device for rehabilitating old pipelines laid in the ground is described. The extent of above-ground prefabrication of a hose-shaped lining for the old pipeline is increased and a closed system for guiding a heatable pressure medium is described. Above-ground, a calibration hose (4) is inverted into the flat-lying lining hose (6) or a lining hose (6) is inverted into a tubular film using compressed air. The lining hose (6), which is provided with the calibration hose (4) and with the tubular foil, is drawn through a shaft into the old pipeline and by means of a heatable pressure medium, which circulates in a closed system, is pressed against the interior wall of the old pipeline and is kept in this position until the resin of the lining hose has hardened. With the process, underground sewer pipes are rehabilitated.

20 Claims, 3 Drawing Sheets

PROCESS AND DEVICE FOR REHABILITATING PIPES

BACKGROUND OF THE INVENTION

1. Field of the Invention

The invention relates to a process for rehabilitating pipes, preferably an underground sewer line, by means of a resin-saturated hose assembly made of fibers, felt or a woven material which is drawn into the pipe through a shaft above the ground to the pipe and, by means of a pressure medium, is pressed against the interior wall of the underground pipe. The pressure medium is heated and the hose assembly is subject to the pressure and heat load until the resin hardens.

The invention also relates to a device for carrying out the rehabilitation process.

2. Description of the Related Art

A process of the initially mentioned type is known wherein a lining hose, produced from a needled felt, from fibers or from a woven material and provided on the outside and/or the inside with a layer which is impermeable to liquid, is saturated at the factory with resin and is transported in a refrigerated car to the location where it is used. After the underground pipe to be rehabilitated has been cleaned, the lining hose is drawn into the underground pipe through a shaft. An inversion pipe is placed into the shaft which protrudes from the upper shaft opening. At the upper edge of the inversion pipe, one end of a calibration hose is secured while at the lower end of the inversion pipe one end of the lining hose is secured. Under the influence of a pressure medium, preferably water, the calibration hose is inverted into the lining hose. The calibration hose, which is moved through the lining hose under the pressure of the water, enlarges the lining hose and presses it against the interior wall of the underground pipe. At the free front end, i.e., at the inside of the calibration hose, a perforated heating hose is attached which during the inversion of the calibration hose is guided into the lining hose together with the calibration hose. Through the heating hose, heated water or water vapor is then supplied from the outside while water is suctioned off from the lower area of the inversion pipe, so that the filling level of the described system accommodating the pressure medium remains constant.

With the known process, only the resin saturation process of the lining hose is undertaken above ground, wherein said hose is transported in a refrigerator car to the site of installation.

SUMMARY OF THE INVENTION

The invention is based on the task of creating a process of the initially mentioned type in such a way that, through the expansion of the extent of prefabrication undertaken above ground, preferably at the location of impregnation, the working steps and the possible sources of errors are reduced during the installation on-site and in that way, the quality of the completed lining is increased and made uniform.

According to the invention, this task is solved in that one hose is inverted into another by means of compressed air above ground. This hose assembly has an impermeable layer on the outside and the inside and at least one layer in the center which is saturated with resin. The hose assembly is closed at both ends by means of connection heads having a passage. The hose assembly is pulled via a shaft into the underground pipe. A heatable pressure medium is applied through the connection heads in a closed cycle and presses the hose assembly against the interior wall of the pipe to be rehabilitated, and maintains this position until the resin hardens, while the pressure medium flows in one direction through the hose assembly across the entire cross-section during the hardening process.

With the process of the invention, the heated pressure medium, circulating in a cycle, can be guided through several hose assemblies drawn into pipes, wherein the hose assemblies are connected by means of hoses or lines.

In contrast to the described known process, a prefabricated hose system with a heating medium will be set within the flow of the passage. The hose system thereby becomes a component of the entire heating cycle. In contrast to the process so far, wherein the heating medium circulates in the hose system only, this leads to a better heat distribution, relative to the cross section of the pipe, and to a better controllable (adjustable) heating and cooling curve and possibly also to a clear reduction of the heating and cooling times. The establishment of the hose assembly at the factory results in improved quality control.

Since the pressure medium is in a closed system, no pressure fluctuations occur. Furthermore, an improved compaction is achieved. Several pipes can be rehabilitated simultaneously. The old pipeline can be set horizontally or laterally.

In one embodiment of the process, the heated pressure medium is guided exclusively in a closed system during the time needed for hardening the resin. The pump, provided in the closed system, and the heat exchanger may be uncoupled and the ends of the pipelines or the hoses containing the pressure medium may be shut off by means of shutoff members. The shut-off is opened at the end of the subsequent cooling period and the pressure medium is then drawn off. Furthermore, the connection heads at the ends of the lining hose are removed. In order to prevent negative pressure, a safety valve may be provided.

The device for carrying out the process has a pressure chamber, arranged above ground and operated by compressed air, which is provided with a connecting piece for securing one end of the lining hose and the calibration hose, which can be inverted into the lining hose, or the tubular film and the lining hose, which can be inverted into the tubular film. One or several lining hoses, which have been drawn into old pipeline, form a part or parts of a closed hose or pipeline system in which at least one pump and at least one heating arrangement are provided for the pressure medium guided through the system.

Additional characteristics of the invention result from the claims.

While the invention is susceptible to various modifications and alternative forms, specific embodiments have been shown by way of example in the drawings and will be described in detail herein. However, it should be understood that the claimed invention is not intended to be limited to the particular forms disclosed. Rather, the invention is to cover all modifications, equivalents, and alternatives falling within the spirit and scope of the invention as defined by the appended claims.

BRIEF DESCRIPTION OF THE DRAWINGS

Embodiments of the process or the device of the invention for carrying out the process are shown in the drawings and are described in the following.

Shown are.

DESCRIPTION OF ILLUSTRATIVE EMBODIMENTS

Figure 1:
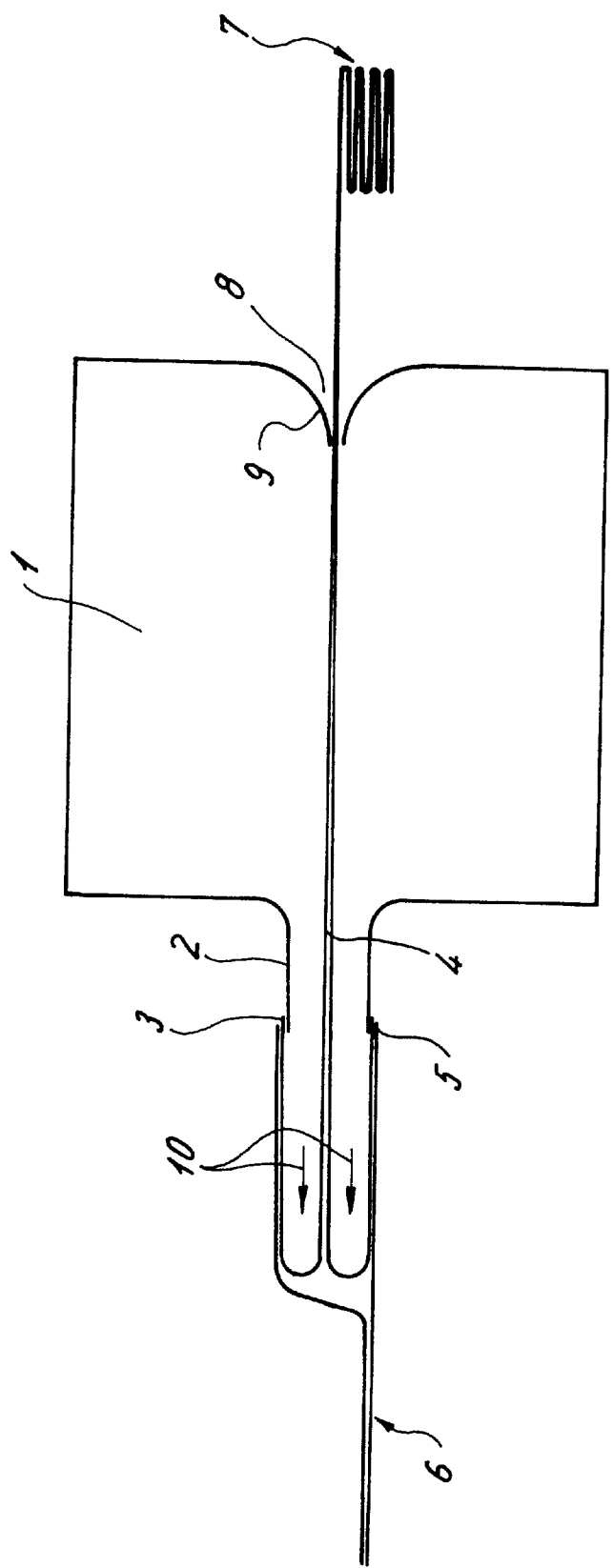
FIG. 1, in schematic representation, an above-ground pressure chamber operated by compressed air.

In FIG. 1, a pressure chamber (1) is shown which is operated with compressed air and which has a connecting piece (2) at whose opening edge one end (3) of a calibration hose (4) and one end (5) of a lining hose (6) are secured. The calibration hose (4) is arranged in a stack (7) outside the pressure chamber (1) and is guided through an opening (8) provided with a seal (9) into the pressure chamber (1) and is attached to the connecting piece (2) with its free end (3). Due to the compressed air which acts in the direction of the arrows (10), the lining hose (6) is enlarged and it receives the calibration hose (4) in its interior.

Figure 6:
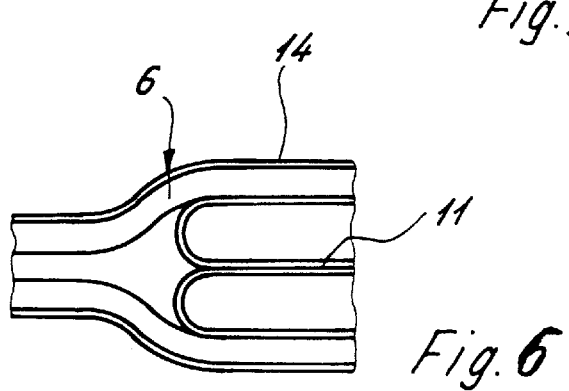

The calibration hose (4), as shown in FIG. 6, may be in the form of a synthetic hose (11).

Figures 4, 5:
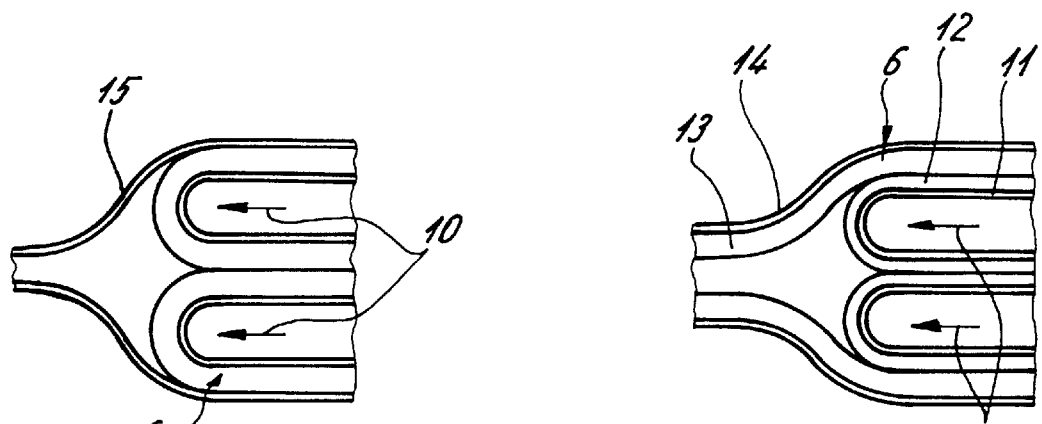
FIG. 4, the above-ground inversion of a lining hose into a tubular film using compressed air.
FIG. 5, the above-ground inversion of a calibration hose into a lining hose using compressed air, wherein the calibration hose is provided with a resin carrier and FIG. 6, the above-ground inversion of a synthetic calibration hose into a lining hose, also using compressed air.

However, there is also the possibility, as can be gathered from FIG. 5, of coating the synthetic hose (11) of the calibration hose with a resin carrier (12). During the inversion of the calibration hose into the lining hose (6), this resin carrier combines with the resin-saturated layer (13) of the lining hose (6) which is provided on the outside in a layer (14) impermeable to liquid.

It can be gathered from FIG. 4 that there also exists the possibility of inverting a lining hose (6) into a tubular film (15) by means of the pressure chamber (1).

The hose assembly of a calibration hose (4) and a lining hose (6) or of a tubular film (15) and a lining hose (6) is provided at the ends with a connection head (16) which has a smaller diameter than the old pipe to be rehabilitated.

Figure 3:
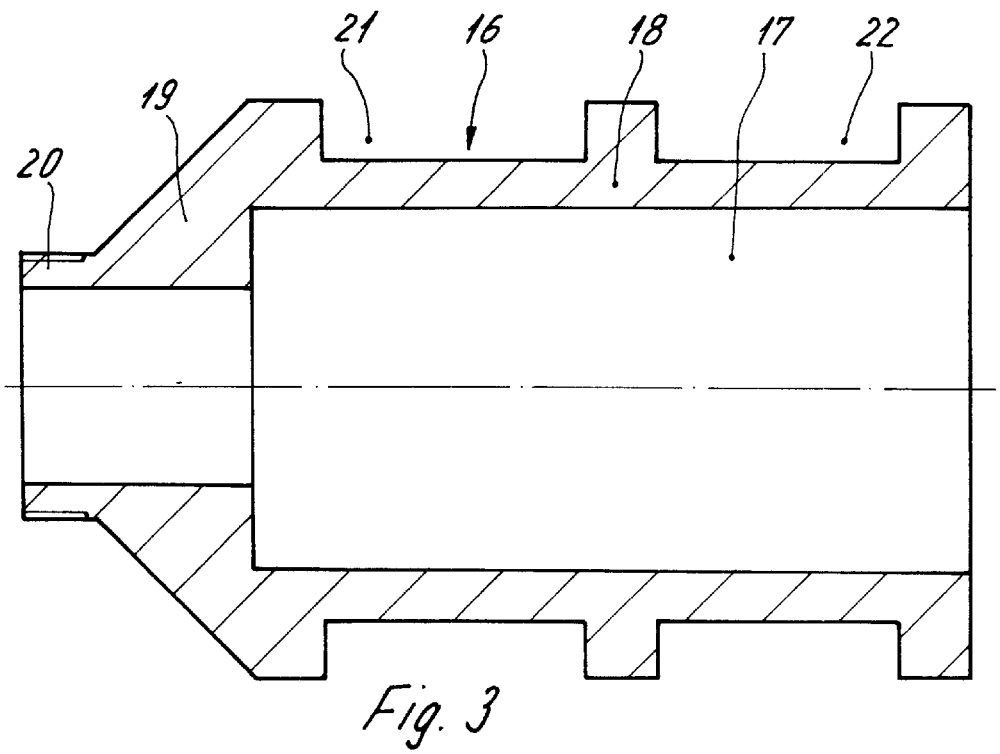
FIG. 3, a connection head for the end of a lining hose in cross section.

The connection head shown in cross section in FIG. 3 is produced, for example, from aluminum or any other light metal, and is in the form of a hollow body. The interior space (17) is open at the front ends and is composed of a cylindrical part (18) and a conical part (19). In front of the conical part, a connection piece (20), provided with an external thread, is arranged. At this connection piece, a tightening nut for a rope for drawing the lining hose into a pipeline or a hose assembly can be secured.

In order to connect the ends of the lining hose with a connection head (16), hose ends are pulled onto the connection head having annular grooves (21, 22). Around the ends of the lining hose, mounting clamps (23, 24) are placed which press parts of the end of the lining hose into the annular grooves (21, 22).

Figure 2:
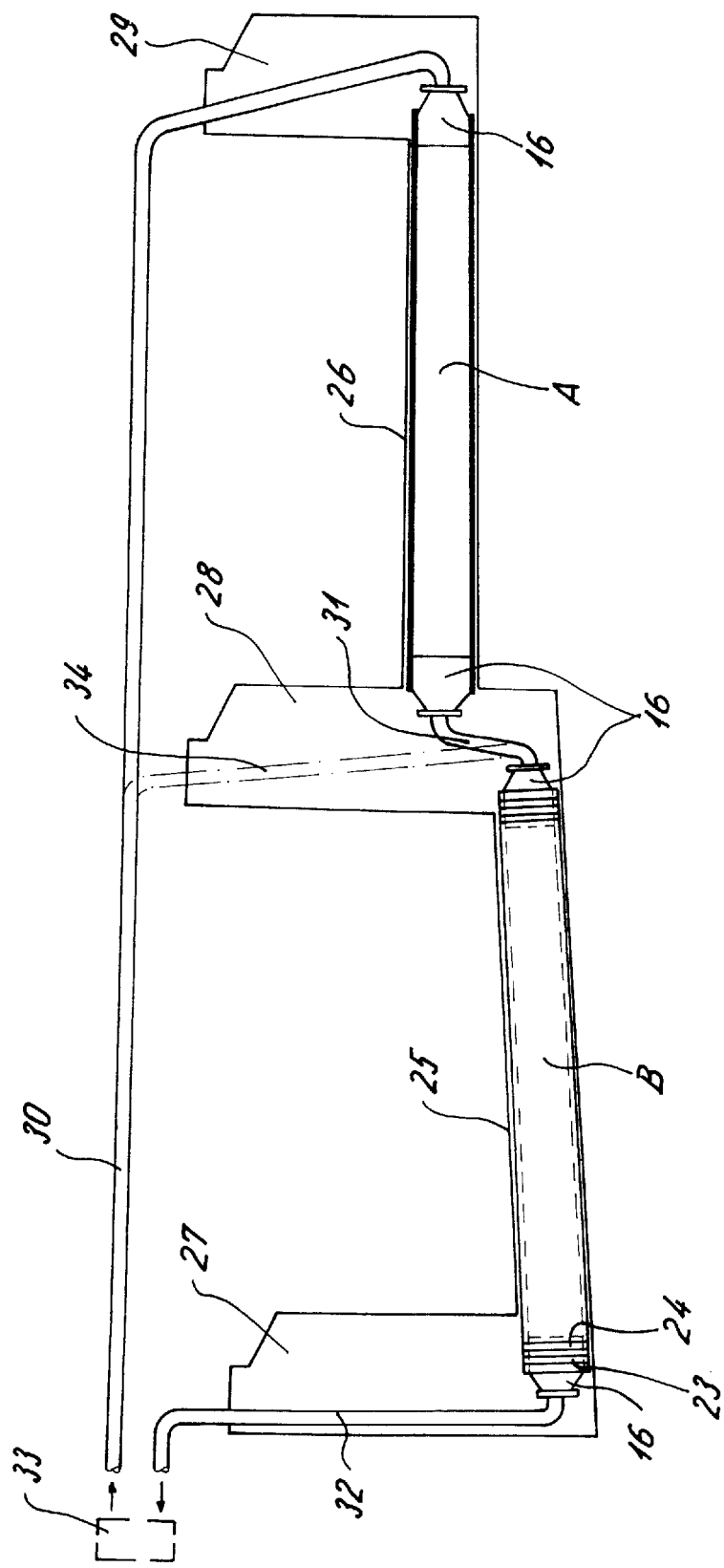
FIG. 2, lining hoses drawn into two old pipelines which are staggered in their height with respect to each other and the assigned pipe or hose system for accommodating the pressure medium in a closed cycle.

In the case of the embodiment example shown in FIG. 2, lining hoses are drawn into two pipes (25, 26) which are accessible from the surface via shafts (27, 28, 29) and which may be produced according to the embodiment examples in the FIGS. 4, 5 or 6. These hose-shaped linings are parts of a closed system for a pressure medium, for example water, which is supplied through a pipe or hose line (30) to the connection head (16) of the hose-shaped lining (A) and passes through a connection hose (31) into the hose-shaped lining (B) and is then guided via the hose or pipeline (32) out of the shaft (27) and passes through a heating arrangement (33).

So far as only the hose-shaped lining (B) is drawn into the old pipeline (25), the pressure medium is supplied via the hose or pipeline to the hose and pipeline (34) shown in dashed lines which is connected to the connection head of the hose-shaped lining (B).

The heating arrangement or the heat exchanger (33) may be assembled into a structural unit together with a pump which transports the pressure medium in the closed system. This structural unit may be uncoupled for the cooling period after the free ends of the pipe or hoselines (30 and 33) are closed by means of shutoff devices.

The pressure chamber (1), operated with compressed air, which is used above ground, i.e., at the factory or at the site, is very easy to transport since its dimensions are small.

Reference Symbols:
1 pressure chamber
2 connecting piece
3 end
4 calibration hose
5 end
6 lining hose
7 stack
8 opening
9 seal
10 arrow
11 synthetic hose
12 resin carrier
13 layer
14 layer
15 tubular film
16 connection head
17 interior space
18 cylindrical part
19 conical part
20 connection piece
21 groove
22 groove
23 mounting bracket
24 mounting bracket
25 old pipeline
26 old pipeline
27 shaft
28 shaft
29 shaft
30 hose line
31 connecting hose
32 hose or pipeline
33 heating arrangement
34 hose or pipeline

What is claimed is:

1. A process for rehabilitating an old pipeline laid in the ground, said process comprising;

preparing a hose assembly by inverting a first hose into a second hose by means of compressed air above ground, this hose assembly having an impermeable layer on an outside and on an inside and at least one layer in a center which is saturated with a resin, the hose assembly being closed at both ends by means of connection heads, each having a passage;

drawing the hose assembly into the old pipeline;

guiding a pressure medium which is heatable through the connection heads in a closed cycle;

pressing the hose assembly against the interior wall of the pipeline to be rehabilitated; and maintaining this position until the resin has hardened thus defining a hardening process, the pressure medium flowing in one direction through the hose assembly across an entire cross section of the hose assembly during the hardening process.

2. The process, according to claim 1, the preparing the hose assembly above ground further comprising inverting the first hose being a calibration hose into the second hose being a flat-lying lining hose by means of compressed air; and supplying the ends of the lining hose having the inverted calibration hose with a connection head which drawing means can be attached.

3. The process according to claim 1, in which the heated pressure medium circulating in the closed cycle is guided through a plurality of connected hose assemblies and drawn into the old pipelines.

4. The process according to claim 1, further comprising:

circulating the heated pressure medium in the closed system only during the hardening process;

providing a pump to guide the pressure medium through the connection heads during the hardening process in a closed cycle;

heating the pressure medium with a heating arrangement during the hardening process;

uncoupling the pump and the heating arrangement after completion of the hardening process; and shutting off the ends of the pipelines by a shutoff device until a cooling of the pressure medium has taken place.

5. The process, according to claim 1, the preparing the hose assembly above ground further comprising:

inverting the first hose being lining hose into the second hose being a tubular film by means of compressed air; and supplying the ends of the lining hose, having the surrounding tubular film, with a connection head to which drawing means can be attached.

6. The process according to claim 3 in which the pipelines are displaced horizontally.

7. The process according to claim 3 in which the pipelines are displaced laterally.

8. The process according to claim 1, further comprising:

circulating the heated pressure medium in the closed system only during the hardening process;

providing a pump to guide the pressure medium through the connection heads during the hardening process in a closed cycle;

heating the pressure medium with a heating arrangement during the hardening process;

uncoupling the pump and the heating arrangement after completion of the hardening process; and shutting off the ends of the hoses by a shutoff device until a cooling of the pressure medium has taken place.

9. A closed system for rehabilitating an old pipeline laid in the ground, comprising:

a plurality of connected hose assemblies connected together, each hose assembly having a calibration hose inverted into a lining hose, each hose assembly being drawn into the old pipeline, the hose assembly being constructed using a pressure chamber operated with compressed air aboveground which has a connecting piece for securing one end of the lining hose and the calibration hose;

a pressure medium being circulated through the closed system by a pump; and at least one heating device for heating the pressure medium guided through the system.

10. The system according to claim 9, further comprising; the pump and the heating device forming one structural unit;

shutoff devices being provided in the pipe or hose lines; and a safety valve being provided in the pipelines.

11. The system according to claim 9, in which the connection head is in the form of a hollow body whose interior space is open at a front end and consists of a cylindrical part and a conical part which makes a transition into a cylindrical connection piece provided with an external thread at which a tightening nut can be secured.

12. The system according to claim 11 in which the cylindrical part has annular grooves for accommodating a part of an end of the lining hose which has been pushed onto the connection head as well as for accommodating mounting clamps placed around a hose end.

13. The system according to claim 9 in which the invertible calibration hose is stored outside the pressure chamber in a piled manner, and is guided through the pressure chamber and the connecting piece by means of an opening provided with a seal, the calibration hose being fastened at an edge of the connecting piece.

14. The system according to claim 9, further comprising:

the pump and the heating device forming one structural unit;

shutoff devices being provided in the pipelines; and a safety valve being provided in the pipelines.

15. The system according to claim 9 in which the connection head is in the form of a hollow body whose interior space is open at a front end and consists of a cylindrical part and a conical part which makes a transition into a cylindrical connection piece provided with an external thread at which a tightening nut can be secured.

16. The system according to claim 15 in which the cylindrical part has annular grooves for accommodating a part of an end of the lining hose which has been pushed onto the connection head as well as for accommodating mounting clamps placed around a hose end.

17. The system according to claim 8 in which the invertible lining hose is stored outside the pressure chamber in a piled manner, an opening having a seal guiding the lining hose through the pressure chamber and the connecting piece, the lining hose being fastened at an edge of the connecting piece.

18. A method of preparing a hose assembly suitable for rehabilitating a conduit, comprising:

providing a lining hose adapted to receive a thermosetting resin;

impregnating said resin into said lining hose; and everting a calibration hose inside of said resin-impregnated lining hose;

whereby said providing, said impregnating and said everting each occur outside of said conduit.

19. A method of rehabilitating a pipeline comprising:

preparing a hose assembly having a resin-impregnated lining hose and an everted calibration hose therein;

attaching a connection head to each end of said hose assembly;

locating said hose assembly within said pipeline to be rehabilitated;

expanding said hose assembly into intimate contact with said pipeline; and heating said thermo-setting resin to harden said hose assembly thereby rehabilitating said pipe.

20. A closed system for rehabilitating an old pipeline laid in the ground, comprising:

a plurality of connected hose assemblies connected together, each hose assembly having a lining hose inverted into a tubular lining and at least one hose-shaped lining, each hose assembly being drawn into the old pipeline, the hose assembly being constructed using a pressure chamber operated with compressed air above-ground which has a connecting piece for securing one end of the tubular film and the lining hose;

a pressure medium to circulate through the closed system by at least one pump; and at least one heating device for heating the pressure medium guided through the system.

* * * * *